(12) United States Patent
Puigcerver i Perez et al.

(10) Patent No.: US 12,488,237 B2
(45) Date of Patent: Dec. 2, 2025

(54) TRAINING NEURAL NETWORKS USING TRANSFER LEARNING

(71) Applicant: Google LLC, Mountain View, CA (US)

(72) Inventors: Joan Puigcerver i Perez, Zurich (CH); Basil Mustafa, Zurich (CH); André Susano Pinto, Zurich (CH); Carlos Riquelme Ruiz, Zurich (CH); Neil Matthew Tinmouth Houlsby, Zurich (CH); Daniel M. Keysers, Stallikon (CH)

(73) Assignee: Google LLC, Mountain View, CA (US)

(*) Notice: Subject to any disclaimer, the term of this patent is extended or adjusted under 35 U.S.C. 154(b) by 1074 days.

(21) Appl. No.: 17/488,166

(22) Filed: Sep. 28, 2021

(65) Prior Publication Data

US 2022/0108171 A1   Apr. 7, 2022

Related U.S. Application Data

(60) Provisional application No. 63/087,104, filed on Oct. 2, 2020.

(51) Int. Cl.
*G06N 3/08*       (2023.01)
*G06N 3/045*      (2023.01)

(52) U.S. Cl.
CPC ............. *G06N 3/08* (2013.01); *G06N 3/045* (2023.01)

(58) Field of Classification Search
CPC ................................. G06N 3/08; G06N 3/045
See application file for complete search history.

(56) References Cited

U.S. PATENT DOCUMENTS 11,393,182 B2 *   7/2022   Jacquot ............... G06F 18/217
2007/0011114 A1 * 1/2007   Chen .................... G06N 3/086
                                                          706/15

(Continued)

OTHER PUBLICATIONS

Xia et al. ("Transferring Ensemble Representations Using Deep Convolutional Neural Networks for Small-Scale Image Classification", vol. 7, 2019 pp. 168175-168186) (Year: 2019).*

(Continued)

*Primary Examiner* — Imad Kassim
(74) *Attorney, Agent, or Firm* — Fish & Richardson P.C.

(57) ABSTRACT

Methods, systems, and apparatus, including computer programs encoded on computer storage media, for training neural networks using transfer learning. One of the methods includes training a neural network to perform a first prediction task, including: obtaining trained model parameters for each of a plurality of candidate neural networks, wherein each candidate neural network has been pre-trained to perform a respective second prediction task that is different from the first prediction task; obtaining a plurality of training examples corresponding to the first prediction task; selecting a proper subset of the plurality of candidate neural networks using the plurality of training examples; generating, for each candidate neural network, one or more fine-tuned neural networks, wherein each fine-tuned neural network is generated by updating the model parameters of the candidate neural network using the plurality of training examples; and determining model parameters for the neural network using the respective fine-tuned neural networks.

20 Claims, 4 Drawing Sheets

(56) References Cited

U.S. PATENT DOCUMENTS

| | | | |
|---|---|---|---|
| 2019/0197395 A1* | 6/2019 | Kibune | G06N 3/08 |
| 2020/0349416 A1* | 11/2020 | Yang | G06N 20/20 |
| 2022/0051079 A1* | 2/2022 | Laszlo | G06F 18/285 |
| 2022/0058478 A1* | 2/2022 | Kuo | G06N 3/082 |
| 2022/0121902 A1* | 4/2022 | Hann | G06N 3/08 |
| 2022/0180199 A1* | 6/2022 | Xu | G06V 10/82 |

OTHER PUBLICATIONS

Macko et al. ("Improving Neural Architecture Search Image Classifiers via Ensemble Learning", Nov. 20, 2019 ) (Year: 2019).*
Li et al. ("Predicting the Number of Nearest Neighbor for kNN Classifier", Nov. 20, 2019 ) (Year: 2019).*
Raschka et al. ("Model Evaluation, Model Selection, and Algorithm Selection in Machine Learning" 2018) (Year: 2018).*
Li et al. ("Machine Learning Based Online Performance Prediction for Runtime Parallelization and Task Scheduling", 2009 IEEE International Symposium on Performance Analysis of Systems and Software, Boston, MA, USA, 2009, pp. 89-100) (Year: 2009).*
Acharya et al, "Transfer learning with cluster ensembles" ICML, 2012, 11 pages.
Altman, "An introduction to kernel and nearest-neighbor nonparametric regression" The American Statistician, 12 pages.
Argyriou et al, "Multi-task feature learning" NIPS, 2006, 8 pages.
Bachman et al, "Learning with pseudo-ensembles" NIPS, 2014, 9 pages.
Barbu et al, "Objectnet: A large-scale bias-controlled dataset for pushing the limits of object recognition models" ICML, 2019, 11 pages.
Ben-David et al, "A theory of learning from different domains" Machine Learning, 2010, 25 pages.
Ben-David et al, "Analysis of representations for domain adaptation" NIPS, 2006, 8 pages.
Bengio, "Deep learning of representations for unsupervised and transfer learning" JMLR, 2012, 21 pages.
Berg et al, "Birdsnap: Large-scale fine-grained visual categorization of birds" CVPR, 2014, 8 pages.
Blitzer et al, "Learning bounds for domain adaptation" NIPS, 2007, 8 pages.
Bossard et al, "Food-101-mining discriminative components with random forests" ECCV, 2014, 16 pages.
Caruana et al, "Ensemble selection from libraries of models" ICML, 2004, 9 pages.
Caruana et al, "Multitask learning" Machine Learning, 1997, 255 pages.
Chen et al, "A closer look at few-shot classification" arXiv, 2019, 17 pages.
Cheng et al, "Remote sensing image scene classification: Benchmark and state of the art" arXiv, 2017, 17 pages.
Cheung et al, "Superposition of many models into one" NIPS, 2019, 18 pages.
Chollet, "Xception: Deep learning with depthwise separable convolutions" IEEE, 2017, 8 pages.
Cimpoi et al, "Describing textures in the wild" CVPR, 2014, 8 pages.
Dai et al, "Boosting for transfer learning" ICML, 2007, 8 pages.
Deng et al, "ImageNet: A large-scale hierarchical image database" IEEE, 2009, 8 pages.
Dhillon et al, "A baseline for few-shot image classification" arXiv, 2020, 20 pages.
Djolonga et al, "On robustness and transferability of convolutional neural networks" arXiv, 2020, 24 pages.
Donahue et al, "Decaf: a deep convolutional activation feature for generic visual recognition" ICML, 2014, 9 pages.
Du et al, "Hypothesis transfer learning via transformation functions" NIPS, 2017, 11 pages.
Dvornik et al, "Diversity with cooperation: ensemble methods for few-shot classification" arXiv, 2019, 12 pages.
Dvornik et al, "Selecting relevant features from a universal representation for few-shot classification" arXiv, 2020, 24 pages.
Eigen et al, "Learning factored representations in a deep mixture of experts" arXiv, 2013, 8 pages.
Evgeniou et al, "Learning multiple tasks with kernel methods" JMLR, 2005, 23 pages.
Fedus et al, "Hyperbolic discounting and learning over multiple horizons" arXiv, 2019, 28 pages.
Fei-Fei et al, "Learning generative visual models from few training examples: an incremental bayesian approach tested on 101 object categories" CVPR, 2007, 12 pages.
Fellbaum, "Wordnet" encyclopedia of applied linguistics, 2012, 8 pages.
Fort et al, "Deep ensembles: a loss landscape perspective" arXiv, 2019, 14 pages.
Fukushima, "Neocognitron: a self-organizing neural network model for a mechanism of pattern recognition unaffected by shift in position" Biological cybernetics, 1980, 10 pages.
Geiger et al, "are we ready for autonomous driving? The kitti vision benchmark suite" IEEE, 2012, 8 pages.
github.com [online], "dSprites: dis-entanglement testing sprites dataset" 2017, retrieved on Feb. 9, 2022, retrieved from URL <https://github.com/deepmind/dsprites-dataset/>, 4 pages.
Glorot et al, "Deep sparse rectifier neural networks" ICAIS, 2011, 9 pages.
He et al, "AutoML: A survey of the state-of-the-art" arXiv, 2019, 17 pages.
He et al, "Deep residual learning for image recognition" IEEE, 2016, 9 pages.
He et al, "Identity mappings in deep residual networks" arXiv, 2016, 15 pages.
Helber et al, "EuroSAT: A novel dataset and deep learning benchmark for land use and land cover classification " arXiv, 2019, 9 pages.
Hendrycks et al, "Benchmarking neural network robustness to common corruptions and perturbations" arXiv, 2019, 16 pages.
Hendrycks et al, "Natural adversarial examples" arXiv, 2019, 12 pages.
Hendrycks et al, "The many faces of robustness: a critical analysis of out-of-distribution generalization" arXiv, 2020, 18 pages.
Hinton et al, "Distilling the knowledge in a neural network" arXiv, 2015, 9 pages.
Houlsby et al, "Parameter-efficient transfer learning for NLP" arXiv, 2019, 13 pages.
Jacob et al, "Clustered multi-task learning: a convex formulation" NIPS, 2008, 8 pages.
Jacobs et al, "Learning piecewise control strategies in a modular neural network architecture" IEEE, 1993, 9 pages.
Johnson et al, "CLEVR: a diagnostic dataset for compositional language and elementary visual reasoning" CVPR, 2017, 10 pages.
kaggle.com [online], "diabetic retinopathy detection" 2015, retrieved on Feb. 9, 2022, retrieved from URL <https://www.kaggle.com/c/diabetic-retinopathy-detection/data>, 2 pages.
Kim et al, "Tree-guided group lasso for multi-response regression with structured sparsity, with an application to eqtl mapping" Annals of Applied Statistics, 2012, 24 pages.
Kolesnikov et al, "Big transfer (BiT): General visual representation learning" ECCV, 2020, 17 pages.
Krause et al, "3D object representations for fine-grained categorization" IEEE, 2013, 8 pages.
Krizhevsky, "Learning multiple layers of features from tiny images" Technical report, 2009, 60 pages.
Kuzborskij et al, "Stability and hypothesis transfer learning" ICML, 2013, 9 pages.
Laine et al, "Temporal ensembling for semi-supervised learning" arXiv, 2017, 13 pages.
Lakshminarayanan et al, "Simple and scalable predictive uncertainty estimation using deep ensembles" NIPS, 2017, 12 pages.
LeCun et al, "Backpropagation applied to handwritten zip code recognition" Neural computation, 1989, 11 pages.
LeCun et al, "Learning methods for generic object recognition with invariance to pose and lighting" IEEE, 2004, 8 pages.

(56) References Cited

OTHER PUBLICATIONS

Lee et al, "Why M heads are better than one: training a diverse ensemble of deep networks" arXiv, 2015, 18 pages.
Liu et al, "Representation learning using multi-task deep neural networks for semantic classification and information retrieval" Proceedings of the Annual Conference of the North American Chapter of the Association for Computational Linguistics, 2015, 10 pages.
Long et al, "Deep transfer learning with joint adaptation networks" ICML, 2017, 10 pages.
Long et al, "Learning transferable features with deep adaptation networks" arXiv, 2015, 9 pages.
Lounici et al, "Taking advantage of sparsity in multi-task learning" arXiv, 2009, 21 pages.
Maji et al, "Fine-grained visual classification of aircraft" arXiv, 2013, 6 pages.
Mansour et al, "Domain adaptation: Learning bounds and algorithms" arXiv, 2009, 16 pages.
Misra et al, "Cross-stitch networks for multi-task learning" IEEE, 2016, 10 pages.
Netzer et al, "Reading digits in natural images with unsupervised feature learning" NIPS, 2011, 9 pages.
Neyshabur et al, "What is being transferred in transfer learning?" arXiv, 2020, 34 pages.
Ngiam et al, "Domain adaptive transfer learning with specialist models" arXiv, 2018, 10 pages.
Nilsback et al, "A visual vocabulary for flower classification" IEEE, 2006, 8 pages.
Oquab et al, "Learning and transferring mid-level image representations using convoloution neural networks" IEEE, 2014, 8 pages.
Pan et al, "A survey on transfer learning" IEEE, 2009, 15 pages.
Pan et al, "Domain adaptation via transfer component analysis" IEEE, 2011, 12 pages.
Pardoe et al, "Boosting for regression transfer" ICML, 2010, 8 pages.
Parkhi et al, "Cats and dogs" IEEE, 2012, 8 pages.
phytorch.org [online], "Pytorch Hub" 2019, retrieved on Feb. 9, 2022, retrieved from URL <https://pytorch.org/hub/, 2 pages.
Puigcerver et al, "Scalable transfer learning with expert models" arXiv, 2020, 27 pages.
Raghu et al, "Transfusion: understanding transfer learning for medical imaging" NIPS, 2019, 11 pages.
Razavian et al, "CNN feature off-the-shelf: an astounding baseline for recognition" IEEE, 2014, 8 pages.
Real et al, "Regularized evolution for image classifier architecture search" AAAI, 2019, 10 pages.
Real et al, "YouTube-BoundingBoxes: A large high-precision human-annotated data set for object detection in video" CVPR, 2017, 10 pages.
Rebuffi et al, "Efficient parametrization of multi-domain deep neural networks" IEEE, 2018, 9 pages.
Rebuffi et al, "Learning multiple visual domains with residual adapters" NIPS, 2017, 11 pages.
Recht et al, "Do ImageNet classifiers generalize to ImageNet?" ICML, 2019, 12 pages.
Rosenfeld et al, "Incremental learning through deep adaptation" arXiv, 2017, 10 pages.
Rusu et al, "Progressive neural networks" arXiv, 2016, 14 pages.
Seni et al, "Ensemble methods in data mining: improving accuracy through combining predictions" Morgan and Claypool Publishers, 2010, 126 pages.
Shankar et al, "Do image classifiers generalize across time?" IMLR, 2019, 23 pages.
Shazeer et al, "Outrageously large neural networks: the sparsely-grated mixture-of-experts layer" arXiv, 2017, 19 pages.
Stickland et al, "Diverse ensembles improve calibration "arXiv, 2020, 6 pages.
Sun et al, "Revisiting unreasonable effectiveness of data in deep learning era" ICCV, 2017, 10 pages.
Sun et al, "Transfer learning with part-based ensembles" Multiple Classifier Systems, 2013, 12 pages.
Szegedy et al, "Going deeper with convolutions" IEEE, 2015, 9 pages.
Szegedy et al, "Rethinking the inception architecture for computer vision" IEEE, 2016, 9 pages.
Tan et al, "A survey on deep transfer learning" arXiv, 2018, 10 pages.
Tzeng et al, "Deep domain confusion: Maximizing for domain invariance" arXiv, 2014, 9 pages.
Veeling et al, "Rotation equivariant CNNs for digital pathology" arXiv, 2018, 8 pages.
Wan et al, "Bi-weighting domain adaptation for cross-language text classification" IJCAI, 2011, 6 pages.
Wang, "Theoretical guarantees of transfer learning" arXiv, 2018, 11 pages.
Webb et al, "To ensemble or not ensemble: when does end-to-end training fail?" CVPR, 2019, 16 pages.
Weiss et al, "A survey of transfer learning" Journal of Big data, 2016, 40 pages.
Wen et al, "Batchensemble: an alternative approach to efficient ensemble and lifelong learning" ICLR, 2020, 20 pages.
Wenzel et al, "Hyperparameter ensembles for robustness and uncertainty quantification" arXiv, 2020, 31 pages.
Wistuba et al, "Automatic frankensteining: creating complex ensembles autonomously" ICDM, 2017, 9 pages.
Wu et al, "Group normalization" ECCV, 2018, 17 pages.
Xavier-Junior et al, "A novel evolutionary algorithm for automated machine learning focusing on classifier ensembles" BRACIS, 2018, 6 pages.
Xie et al, "Self-tanning with noisy student improves imagenet classification" arXiv, 2019, 13 pages.
Xu et al, "A unified framework for metric transfer learning" IEEE, 2017, 14 pages.
Yalniz et al, "Billion-scale semi-supervised learning for image classification" arXiv, 2019, 12 pages.
Yan et al, "Neural data server: A large-scale search engine for transfer learning data", 2020, 10 pages.
Yosinski et al, "How transferable are features in deep neural networks?" NIPS, 2014, 14 pages.
Zhai et al, "A large-scale study of representation learning with the visual task adaptation benchmark" arXiv, 2020, 33 pages.
Zhai et al, "The visual task adaptation benchmark" arXiv, 2019, 35 pages.
Zhang et al, "Facial landmark detection by deep multi- task learning" ECCV, 2014, 15 pages.

\* cited by examiner

TRAINING NEURAL NETWORKS USING TRANSFER LEARNING

CROSS-REFERENCE TO RELATED APPLICATION

This application claims priority to U.S. Provisional Application No. 63/087,104, filed on Oct. 2, 2020. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that is configured to train a neural network to perform a first machine learning task using a set of candidate neural networks that have been pre-trained to perform respective second machine learning tasks. The system can obtain a set of training examples corresponding to the first machine learning task and process the training examples to select one or more of the candidate neural networks. In particular, the system can use the training examples to predict, for each candidate neural network, a performance of the candidate neural network on the first machine learning task if the candidate neural network were fine-tuned for the first machine learning task using the training examples.

After selecting the one or more candidate neural networks, the system can fine-tune the selected candidate using the set of training examples. In this specification, a system "fine-tunes" a neural network when the system updates the parameters of the neural network after the neural network has already been trained. In some implementations, a system can fine-tune a neural network to perform a different machine learning task than the neural network was originally trained to perform. That is, the neural network is first trained to perform one machine learning task, then the parameters of the neural network are updated to configure the neural network to perform a different machine learning task.

In some implementations, the system selects and fine-tunes a single candidate neural network. In some other implementations, the system selects and fine-tune multiple different neural networks. That is, the system can be configured to train an ensemble neural network. In this specification, an ensemble neural network is a neural network that includes multiple different member neural networks (e.g., member neural networks with different architectures and/or parameter values). Each member neural network can be configured to process the network input to the ensemble neural network to generate a respective initial network output, and the ensemble neural network can be configured to combine the initial network outputs to generate a final network output.

In some implementations, after selecting multiple candidate neural networks configured to perform respective second machine learning tasks and fine-tuning the selected candidate neural networks for the first machine learning task, the system can select one or more of the fine-tuned neural networks to include in the final network. For example, the system can select the one or more fine-tuned neural networks that have the highest performance on the first machine learning task when processing a training, validation, or test set.

The subject matter described in this specification can be implemented in particular embodiments so as to realize one or more of the following advantages.

Transfer learning is an efficient technique for training neural networks in situations where training data is scarce or nonexistent. By leveraging a pre-trained neural network that has been trained to perform a first task using a large training data set corresponding to the first task, a training system can train a neural network to perform a second task that is different but related to the first task with high performance even without a large corpus of training data corresponding to the second task.

However, given a set of pre-trained neural networks, some existing systems are unable to determine which of the pre-trained neural networks are most likely to successfully transfer from the first task to the second task. So, these existing systems must fine-tune each pre-trained neural network in the set (or a randomly-selected subset thereof), which is highly inefficient in terms of time, computation cost, and energy. Because of these costs to fine-tune a pre-trained neural network, in many cases it is impractical or impossible to fine-tune each pre-trained neural network in the set. Using techniques described in this specification, a training system can select, from a set of neural networks pre-trained to perform respective first tasks, one or more different candidate neural networks that are likely to perform a different second task well.

In particular, the training system can select the candidate neural networks using a training data set corresponding to the second task, even if the size of the data set is significantly smaller than the training data sets used to pre-train the candidate neural networks. That is, the training system can predict how suited a particular pre-trained neural network is to perform the second task before fine-tuning the network. In some implementations, the training system can evaluate the candidate neural networks using computationally cheap performance proxies. That is, the training system can spend relatively little time and few computational resources to generate, using the training data set, measures of a predicted performance of each candidate neural network when transferred from the first task to the second task.

In some implementations described in this specification, a system can take particular advantage of the transfer learning techniques described in this specification when the first task and the second task are similar. For example, if both the first task and the second task are image processing tasks related to medical images, the training of the second task is likely to be significantly improved (e.g., by requiring less time and/or computational resources to achieve a particular performance). In some implementations described in this specification, a training system can train one or more "base" neural networks on a dataset that includes a wide variety of different inputs (e.g., images from many different domains), then divide this heterogeneous dataset into different categories, training respective "expert" neural network with each category and thus partitioning the space of inputs. Thus, in expectation, at least one of the expert neural networks is likely to improve the training of neural networks configured to perform a wide range of tasks, because the set of candidate networks includes respective expert neural networks that are specifically configured using a wide range of different training data sets.

Ensemble learning is a powerful technique for combining the respective network outputs of multiple different member neural networks to generate combined outputs that are more robust than the network outputs of any individual member neural network. However, in some conventional systems, a training system must train each of the multiple member neural networks from scratch, which can be expensive in terms of time, computational, and energy costs. Training each member neural network independently can further require large amounts of training data, making such training infeasible when training data is scarce.

In some implementations described in this specification, a training system can leverage both the efficiency of transfer learning and the robustness of ensemble learning to train an ensemble neural network by fine-tuning multiple pre-trained member neural networks. The training system can obtain a set of pre-trained candidate neural networks, and fine-tune one or more of them to generate respective member neural networks for the ensemble neural network. Thus, the system can amortize the costs of pre-training the set of candidate neural networks across multiple fine-tuned member neural networks. Because the cost of fine-tuning can be significantly less than pre-training, the marginal cost of fine-tuning additional networks is small.

Diversity introduced upstream, i.e., when pre-training multiple candidate neural networks, can increase the robustness of an ensemble neural network more than diversity introduced downstream, i.e., when fine-tuning the same candidate neural network multiple different times. Furthermore, with a limited corpus of training data available, fine-tuning the same candidate neural network can be ineffective. Using techniques described in this specification, a training system can leverage upstream diversity by selecting multiple different pre-trained neural networks that are likely to significantly improve the robustness of an ensemble neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that is configured to train a neural network to perform a first machine learning task using a set of candidate neural networks that have been pre-trained to perform respective second machine learning tasks.

Figure 1:
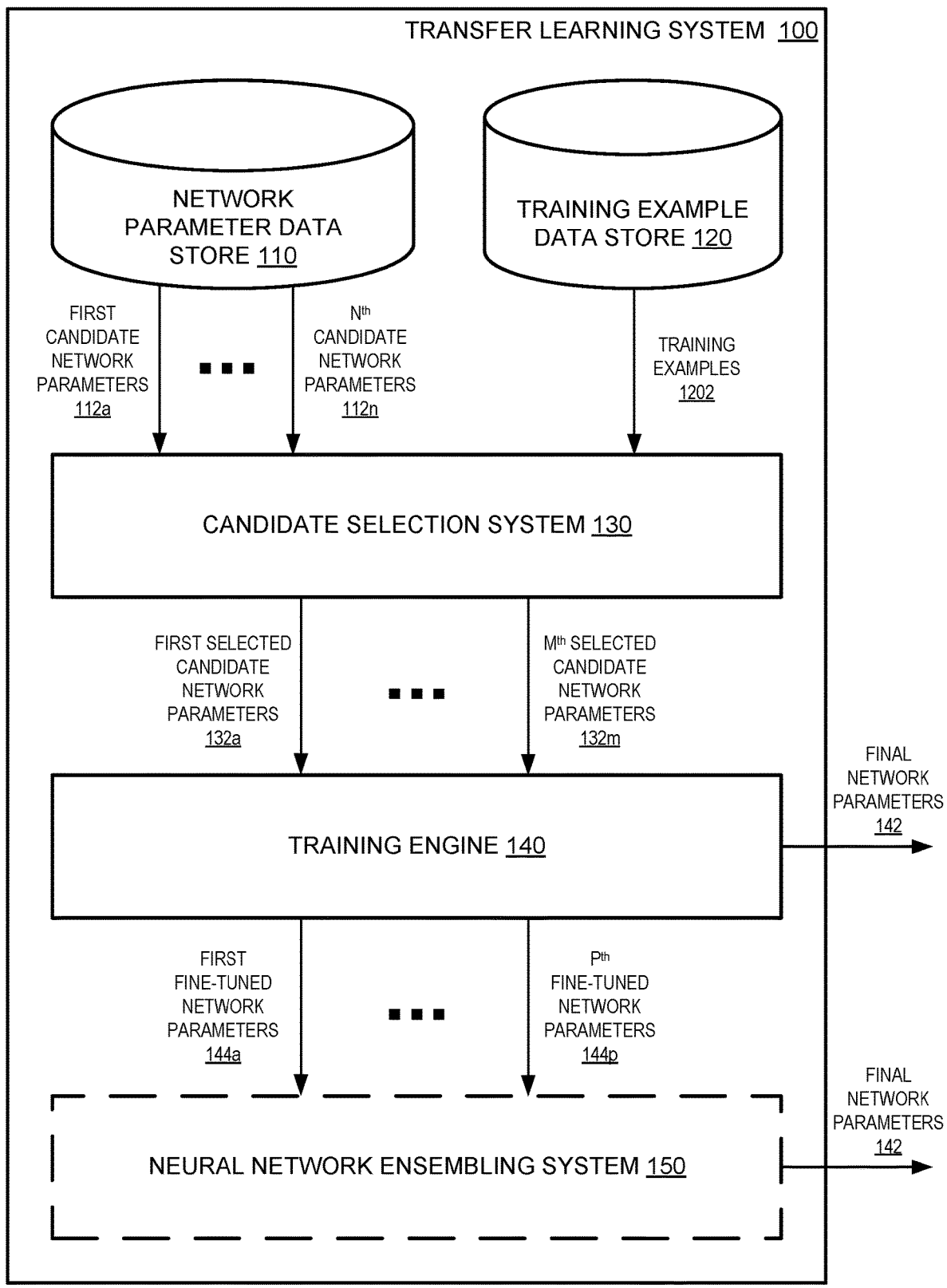
FIG. 1 is a diagram of an example transfer learning system.

FIG. 1 is a diagram of an example transfer learning system 100. The transfer learning system 100 is an example of a system implemented as computer programs on one or more computers in one or more locations, in which the systems, components, and techniques described below can be implemented.

The transfer learning system 100 is configured to train a neural network to perform a first machine learning task by fine-tuning one or more candidate neural networks from a set of multiple pre-trained candidate neural networks. That is, the transfer learning system 100 is configured to generate final network parameters 142 for the neural network by updating a respective set of candidate network parameters 112$a$-$n$ corresponding to each of n different pre-trained candidate neural networks, n>1. As described in more detail below, the final network parameters 142 can include the parameters for a single neural network trained by the transfer learning system 100, or an ensemble of multiple neural networks trained by the transfer learning system 100. That is, the final network parameters 142 can include respective parameters for each of multiple member neural networks of an ensemble neural network.

The transfer learning system 100 includes a network parameter data store 110, a training example data store 120, a candidate selection system 130, a training engine 140, and, optionally, a neural network ensembling system 150.

The network parameter data store 110 is configured to maintain the n sets of candidate network parameters 112$a$-$n$ corresponding to the n candidate neural networks. Each candidate neural network has been pre-trained to perform a respective second machine learning task that is different from the first machine learning task. In some implementations, each candidate neural network in the set of candidate neural networks was pre-trained on the same second machine learning task; in some other implementations, different candidate neural networks were pre-trained on respective different second machine learning tasks.

In some implementations, multiple candidate neural networks in the set of candidate neural networks were trained using the same second training data set (called "second" to differentiate it from the training data set corresponding to the first machine learning task and stored in the training example data store 120, as described in more detail below). In some such implementations, the multiple candidate neural networks can include (i) one or more "base" neural networks that were trained using the entire second training data set, and (ii) one or more "expert" neural networks that were trained using a strict subset of the second training data set.

Example candidate neural networks, and techniques for pre-training them, are discussed in more detail below with reference to FIG. 2.

The training example data store 120 is configured to maintain a training data set corresponding to the first machine learning task for training the neural network. The training data set includes multiple training examples 122. In some implementations, e.g., when the training engine 140 is configured to execute supervised training, each training example includes both a training network input and a ground-truth network output. In some other implementations, e.g., when the training engine 140 is configured to execute unsupervised training, each training example includes only a training network input.

The candidate selection system 130 is configured to obtain (i) the n sets of candidate network parameters 112$a$-$n$ from the network parameter data store 110 and (ii) the training examples 122 from the training example data store 120. The candidate selection system 130 is configured to process the training examples 122 to select a proper subset of the candidate neural networks represented by the candidate network parameters 112*a-n*, i.e., to select m sets of candidate network parameters 132*a-m* from the n sets of candidate network parameters 112*a-n*, m≥1. For example, the training system might select 1, 5, 10, or 100 candidate neural networks from the sets of candidate neural networks, which might include a hundred, a thousand, or a million candidate neural networks.

In particular, the candidate selection system 130 can process the training examples 122 to predict, for each set of candidate network parameters 112*a-n*, a performance of the corresponding candidate neural network on the first machine learning task, if the candidate neural network were fine-tuned using the training examples 122. The candidate selection system 130 can then select the candidate network parameters 132*a-m* with the highest predicted performance.

In some implementations, the candidate selection system 130 uses the training examples 122 to train, for each candidate neural network, a respective machine learning model that can act as a performance proxy for how the candidate neural network would perform on the first machine learning task if fine-tuned using the training examples 122. The training of the machine learning model can be significantly less expensive, in terms of computation and/or time, than fine-tuning the candidate neural network itself, and thus evaluating the performance of the machine learning models to select the m sets of candidate network parameters 132*a-m* can represent a significant improvement in the efficiency of the system 100 compared to existing systems that fine-tune each candidate neural network in the set.

For example, in implementations in which the training examples 122 include pairs of training inputs and corresponding ground-truth outputs, the candidate selection system 130 can process, for each candidate neural network, some or all of the training inputs using the candidate neural network (i.e., according to the respective candidate network parameters 112*a-m*) to generate respective representations of the training inputs.

In some implementations, the respective representation of each training input is the output of the candidate neural network after processing the training input. In some other implementations, the representation can be an intermediate output generated by the candidate neural network while processing the training input, e.g., the output of one or more hidden layers of the candidate neural network. As a particular example, the respective representation of each training input can be the output of the penultimate hidden layer in the candidate neural network, i.e., the activation of the hidden layer directly preceding an "output" layer that projects the activation into an output space corresponding to the second machine learning task for which the candidate neural network is configured.

The candidate selection system 130 can use the representations generated by each candidate neural network, along with the corresponding ground-truth outputs of the training examples 122, to train the machine learning model corresponding to the candidate neural network. That is, the machine learning model corresponding to each candidate neural network can be configured to receive as input a representation of a training inputs and to generate a model output that predicts the ground-truth output corresponding to the training input. Example machine learning models are discussed below with reference to FIG. 4.

The candidate selection system 130 can then determine a performance of the machine learning model corresponding to each candidate neural network (e.g., a training accuracy or a performance on a validation set), and select the candidate neural networks whose corresponding machine learning models have the best performance. In other words, the candidate selection system 130 can select the candidate network parameters 132*a-m* that generated representations of the training inputs that were then used to train the highest-performing machine learning models.

In some other implementations, the candidate selection system 130 has access to the respective second training data set used to train each of the sets of candidate network parameters 112*a-n*; for example, each second training data set can be stored in the training example data store 120. The candidate selection system 130 can select the m sets of candidate network parameters 132*a-m* by comparing (i) the training examples 122 with (ii) the respective second training data sets.

For example, for each candidate neural network, the candidate selection system 130 can compare i) a distribution of the training inputs of the training examples 122 and ii) a distribution of training inputs in the second training data set corresponding to the candidate neural network. The distribution over a set of training inputs can include a respective distribution over possible values for each of one or more features of the training inputs. For example, if the training inputs include images, then the distribution can include respective distributions over intensity values for each pixel in the images.

Although the two sets of training inputs correspond to different machine learning tasks, in some implementations the distributions of the two sets can still be directly compared, e.g., if both machine learning tasks are computer vision tasks and both sets of training inputs include images. If the distributions are similar, then the candidate selection system 130 can predict that the candidate neural network is more likely perform well at the first machine learning task because the candidate neural network has already been configured to process inputs drawn from a similar distribution as those drawn for the first machine learning task. As a particular example, the candidate selection system 130 can select the candidate neural networks with the smallest KL-divergence between the two distributions.

As another example, for each candidate neural network, the candidate selection system 130 can compare i) a distribution of the ground-truth outputs of the training examples 122 and ii) a distribution ground-truth outputs in the second training data set corresponding to the candidate neural network. The distribution over a set of ground-truth outputs can include a respective distribution over possible values for each of one or more features of the ground-truth outputs. For example, if the ground-truth outputs include a ground-truth classification of the training input (i.e., an identification of one or more classes, from a set of multiple classes, to which the training input belongs), then the distribution can include respective distributions over likelihood values for each class in the set of classes.

Although the two sets of ground-truth outputs correspond to different machine learning tasks, in some implementations the distributions of the two sets can still be directly compared, e.g., if both sets of ground-truth outputs include semantic labels. If the distributions are similar, then the candidate selection system 130 can predict that the candidate neural network is more likely perform well at the first machine learning task because the candidate neural network has already been configured to generate outputs drawn from a similar distribution as those drawn for the first machine learning task. As a particular example, the candidate selection system 130 can select the candidate neural networks with the smallest KL-divergence between the two distributions.

As another example, the candidate selection system 130 can obtain (e.g., from the network parameter data store 110) parameters for a trained machine learning model that is configured to process a training input from the training examples 122 and to generate a model output that identifies one or more of the n candidate neural networks that are likely to have been trained using inputs similar to the training input. Such a machine learning model is sometimes called an "expert prediction" model (or an "expert prediction network" when the machine learning model is a neural network). The expert prediction model can be trained (e.g., by the training system 200 described below with reference to FIG. 2) using pairs of (i) a training input from the second training data set of a respective candidate neural network and (ii) ground-truth identification of the respective candidate neural network.

For instance, the expert prediction model can be configured to generate a model output that includes, for each candidate neural network, a respective likelihood score representing a likelihood that the processed training example is drawn from the same distribution as the second training data set corresponding to the candidate neural network. The candidate selection system 130 can then select each of the m selected candidate neural networks according to the corresponding likelihood scores for respective training inputs. For example, for each candidate neural network, the candidate selection system 130 can combine the corresponding likelihood scores to generate a similarity score representing a predicted similarity between the training examples 122 and the second training data set corresponding to the candidate neural network, and select the m candidate neural networks with the highest similarity scores.

As a particular example, the similarity score for a candidate neural network can be the geometric mean of the corresponding likelihood scores. As another particular example, the similarity score for a candidate neural network e can be (or be proportional to):

$$\frac{1}{N_T} \sum_{i=1}^{N_T} \log Q_{EPN}(e \mid X = x_i)$$

where $N_T$ is the number of training examples processed by the expert prediction model, $x_i$ is the $i^{th}$ training example, and $Q_{EPN}(e|X=x_i)$ is the likelihood predicted by the expert prediction model that the $i^{th}$ training example $x_i$ corresponds to the candidate neural network e.

As another example, in some implementations each of the candidate neural networks have been trained to perform the same second machine learning task. For example, each candidate neural network can have been trained using respective different subsets of the same second training data set. In some such implementations, the candidate selection system 130 can obtain (e.g., from the network parameter data store 110) parameters for a trained machine learning model configured to perform the same second machine learning task as the candidate neural networks. The candidate selection system 130 can process at least some of the training inputs from the training examples 122 using the machine learning model to generate respective model outputs. The model outputs are in the same space as the ground-truth outputs in the second training data set used to train the candidate neural networks. Thus, for each candidate neural network, the candidate selection system 130 can determine a similarity between (i) the model outputs and (ii) the ground-truth outputs in the subset of the second training data set used to train the candidate neural network. The candidate selection system 130 can select the m candidate neural networks with the largest corresponding similarity. As a particular example, the candidate selection system 130 can select the candidate neural networks with the smallest KL-divergence between (i) the distribution of model outputs and (ii) the distribution of ground-truth outputs in the subset of the second training data set used to train the candidate neural network.

In some implementations, the number m of selected candidate neural networks can depend on the predicted performance of the candidate neural networks at the first machine learning task.

For example, the candidate selection system 130 can select a candidate neural network only if the predicted performance of the candidate neural network satisfies a predetermined threshold (e.g., only if the nearest-neighbor cross validation accuracy exceeds a predetermined threshold). As another example, the candidate selection system 130 can select a candidate neural network only if the predicted performance of the candidate neural network is within a predetermined threshold of the highest-performing candidate neural network (e.g., within T % of the highest-performing candidate neural network). In some implementations, the candidate selection system 130 can select every candidate neural network that satisfies the threshold. In some other implementations, the candidate selection system 130 can select up to a maximum number of candidate neural networks that satisfy the threshold (e.g., the highest-performing candidate neural networks).

The training engine 140 is configured to obtain (i) the selected candidate network parameters 132*a-m* of each selected candidate neural network and (ii) the training examples 122. The training engine 140 is configured to fine-tune each selected candidate neural network using the training examples 122 to generate one or more respective fine-tuned neural networks. That is, for each selected set of candidate network parameters 132*a-m*, the training engine 140 can update the selected set of candidate network parameters 132*a-m* to generate one or more respective sets of fine-tuned network parameters. For example, the training engine 140 can generate each set of fine-tuned network parameters by updating the selected set of candidate network parameters 132*a-m* using a respective different set of hyper-parameters (e.g., different learning rate schedules, different batch sizes, different momentum or Adam hyperparameters, and so on).

In some implementations, for each of one or more of the selected candidate neural networks, the training engine 140 can modify the network architecture of the selected candidate neural network before fine-tuning the selected candidate neural network. For example, the training engine 140 can modify the architecture so that the candidate neural network is configured to generate outputs corresponding to the first machine learning task, e.g., outputs that have the required shape. For example, the training engine 140 can remove one or more neural network layers from the candidate neural network. Instead or in addition, the training engine 140 can add new, untrained neural network layers to the candidate neural network. As a particular example, the training engine 140 can remove the final neural network layer of the candidate neural network (often called the "head" of the candidate neural network) and add a new untrained neural network layer in its place.

To generate a set of fine-tuned network parameters from a selected set of candidate network parameters 132a-m, the training engine 140 can process each training input of the training examples 122 according to the selected set of candidate network parameters 132a-m (or a modified version thereof, as described above) to generate a respective training output. The training engine 140 can determine an error between the training output and the corresponding ground-truth output. The training engine 140 can then update the selected set of candidate network parameters 132a-m according to the determined errors, e.g., using backpropagation and gradient descent.

In some implementations, the number of fine-tuned neural networks generated by the training engine 140 per selected candidate neural network depends on the number m of selected candidate neural networks. For example, the training engine 140 can have a fixed computational budget, such that the training engine can train p fine-tuned neural networks. Thus, given m selected pre-trained neural networks, the training engine 140 can generate p/m, fine-tuned neural networks per pre-trained neural network. As described above, the candidate selection system 130 can identify a maximum number of candidate neural networks that may be selected. If the candidate selection system 130 selects fewer than the maximum number of selected candidate neural networks, then the training engine 140 can make up for the difference by generating more fine-tuned neural networks corresponding to respective selected candidate neural networks, up to the desired total of p fine-tuned neural networks. As another example, the training engine 140 can determine the number of fine-tuned neural networks to generate for each selected candidate neural network according to the predicted performance of the neural network on the first machine learning task, as determined by the candidate selection system. For instance, the training engine 140 can determine to generate more fine-tuned neural networks for candidate neural networks that have a higher predicted performance on the first machine learning task.

In implementations in which the transfer learning system 100 does not include the neural network ensembling system 150, after fine-tuning the selected sets of candidate network parameters 132a-m, the training engine 140 can directly output the final network parameters 142. In these implementations, the final network parameters can include the respective fine-tuned network parameters corresponding to each fine-tuned neural network generated by the training engine 140. For example, if the training engine 140 generated a single fine-tuned neural network, then the final network parameters 142 can be the parameters of the single fine-tuned neural network. As another example, if the training engine 140 generated multiple different fine-tuned neural networks (e.g., multiple fine-tuned neural networks corresponding to the same selected candidate neural network and/or respective fine-tuned neural networks corresponding to each of multiple candidate neural networks), then the final parameters 142 can represent an ensemble neural network that includes each generated fine-tuned neural network.

The ensemble neural network can be configured to receive a network input corresponding to the first machine learning tasks and to process the network input using each of the multiple fine-tuned neural networks (also called "member" neural networks) to generate respective network outputs, and then combine the network outputs of the member neural networks to generate a final combined network output. For example, the ensemble neural network can determine the average of the respective network outputs. As another example, the ensemble neural network can process the respective network outputs using a voting algorithm, where each member neural network submits a "vote" according to the network output of the member neural network.

The neural network ensembling system 150 can be configured to obtain the p sets of fine-tuned network parameters 144a-p generated by the training engine and select a strict subset of the sets of fine-tuned network parameters 144a-p to include in the final network parameters 142. That is, the neural network ensembling system 150 can select one or more of the generated fine-tuned neural networks to be member neural networks in an ensemble neural network.

For example, the neural network ensembling system 150 can select the one or more fine-tuned neural networks from the set of generated fine-tuned neural networks according to a performance of the fine-tuned neural networks during training, e.g., by selecting the one or more fine-tuned neural networks with the highest training accuracy or lowest training loss. As another example, the neural network ensembling system 150 can select the one or more fine-tuned neural networks with a highest performance on a validation set or a test set.

As another example, the neural network ensembling system 150 can select, at each of multiple stages, a fine-tuned neural network that, when added to the ensemble neural network, causes the performance of the ensemble neural network to improve by the most. That is, at each stage, the neural network ensembling system 150 can temporarily add each remaining fine-tuned neural network (i.e., each fine-tuned neural network that has not already been added to the ensemble neural network) to the ensemble neural network, and determine the performance of the ensemble neural network, e.g., on a validation data set corresponding to the first machine learning task. The neural network ensembling system 150 can then select the remaining fine-tuned neural network for which the ensemble neural network had the highest performance to permanently add to the ensemble neural network. As a particular example, the neural network ensembling system 150 can select the remaining fine-tuned neural network that maximizes accuracy or minimizes cross-entropy on the validation data set.

After generating the final network parameters 142, i.e., after completing training of the neural network, the transfer learning system 100 can provide the final network parameters 142 to an inference system that is configured to obtain new inputs to the neural network and to process the inputs using the neural network to generate respective outputs.

The first machine learning task and the one or more second machine learning tasks can include any appropriate task.

For example, one or more of the machine learning tasks may be a speech recognition task, where the corresponding neural network is configured to process a representation of an audio waveform to generate an output that characterizes a sequence of phonemes, characters, or words corresponding to the audio waveform.

As another example, one or more of the machine learning tasks may be a video analysis task, where the corresponding neural network is configured to process a sequence of video frames to generate an output that characterizes the video frames, e.g., by characterizing whether the video frames depict a person performing a particular action.

As another example, one or more of the machine learning tasks may be a natural language processing task, where the corresponding neural network is configured to process a portion of text to generate an output that characterizes the portion of text, e.g., by characterizing a translation of the portion of text into a different natural language.

As another example, one or more of the machine learning tasks may be an image processing task, where the corresponding neural network is configured to process an input that includes an image to generate a corresponding output, e.g., a classification output, a regression output, or a combination thereof.

As a particular example, the neural network can be configured to process an image to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the neural network can be configured to process an image to generate a pixel-level classification output that includes, for each pixel, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the neural network can be configured to process an image to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box.

Figure 2:
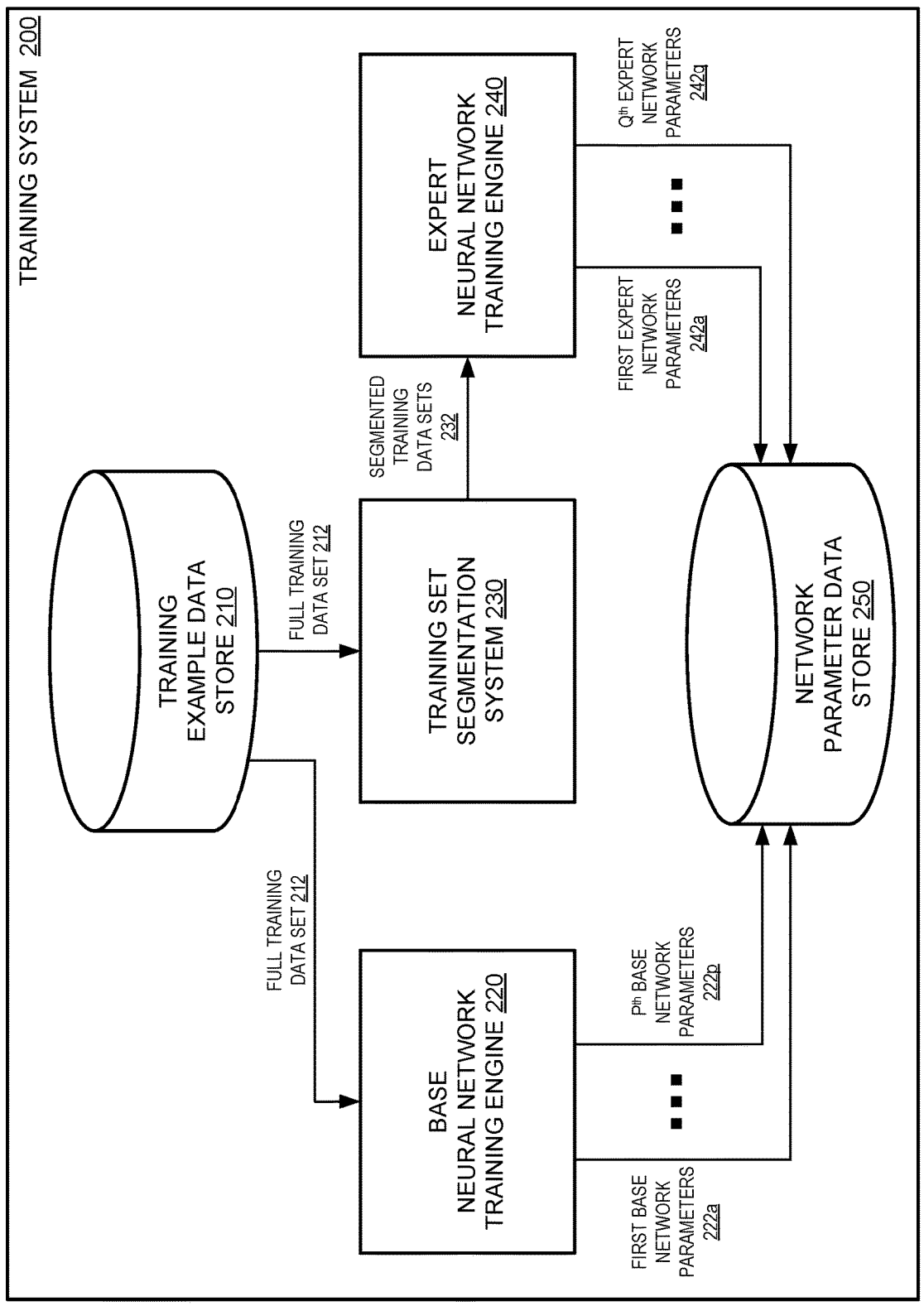
FIG. 2 is a diagram of an example training system.

FIG. 2 is a diagram of an example training system 200. The training system 200 is an example of a system implemented as computer programs on one or more computers in one or more locations, in which the systems, components, and techniques described below can be implemented.

The training system 200 is configured to train a set of multiple candidate neural networks to perform a second machine learning task. The candidate neural networks can then be used to train a different neural network to perform a first machine learning task that is different from the second machine learning task, e.g., by the transfer learning system 100 described above with reference to FIG. 1. The following description refers to training candidate neural networks to perform the same second machine learning task; the techniques described below can be repeated with respect to multiple different second machine learning tasks to generate a final set of candidate neural networks that includes respective trained candidate neural networks configured to perform different second machine learning tasks.

The training system 200 includes a training example data store 210 that is configured to maintain a training data set 212 that includes multiple training examples for training the candidate neural networks to perform the second machine learning task.

In particular, the training system 200 can use the training data set 212 to train a set of candidate neural networks that includes: (i) one or more "base" neural networks that were trained using the entire training data set 212, and (ii) one or more "expert" neural networks that were trained using a strict subset of the training data set 212.

The training system 200 includes a base neural network training engine 220 that is configured to obtain the training data set 212 and to use the training data 212 to train p base neural networks, $p \geq 1$. That is, the base neural network training engine 220 can process the training examples in the training data set 212 used the respective base neural networks to generate p sets of base network parameters 222a-p.

In some implementations, the set of base neural networks includes multiple particular base neural networks for which initial values for the respective base network parameters 222a-p of each particular base neural network were different. That is, each particular base neural network was "seeded" differently. As a particular example, each of the particular base neural networks can have the same network architecture and can be trained using the same training data set 212 but can have respective different sets of base network parameters 222a-p because of the different seeding.

Instead or in addition, the set of base neural networks can include multiple particular base neural networks that have different network architectures. For example, the multiple particular base neural networks can have different numbers of hidden layers.

After generating the p sets of base network parameters 222a-p, the base neural network training engine 220 can provide the base network parameters to a network parameter data store 250 of the training system 200.

The training system 200 includes a training set segmentation system 230 that is configured to obtain the full training data set 212 and to generate multiple different segmented training data sets 232 that are each different strict subsets of the full training data set 230. Each segmented training data set 232 can then be used by an expert neural network training engine 240 of the training system 200. In some implementations, the segmented training data sets 232 are disjoint, i.e., no training example in the full training data set 212 is in more than one segmented training data set 232. In some other implementations, the segmented training data sets 232 are not disjoint, i.e., can share some training examples.

The training set segmentation system 230 can segment the full training data set 212 in any appropriate way. For example, the training set segmentation system 230 can randomly sample the full training data set 212 to generate the segmented training data sets.

As another example, each segmented training data set 232 can correspond to a respective different category of ground-truth labels in the full training data set 212, (e.g., if the ground-truth labels are semantic classes, the categories may include animals, arts, birds, food, material, person, phenomenon, plant, product, and so on). In some implementations, the classes are organized in a hierarchy; that is, the full training data set 212 includes an expressive hierarchy that links classes and ancestors via "is-a" relationships.

The expert neural network training engine 240 can obtain the segmented training data sets 232 and use the segmented training data sets 232 to generate q sets of expert network parameters 242a-q.

In some implementations, the expert neural network training engine 240 can generate the sets of expert network parameters 242a-q by fine-tuning the base network parameters 222a-p generated by the base neural network training engine 220. That is, the expert neural network training engine 240 can obtain the respective base network parameters 222a-p corresponding to one or more base neural networks from the network parameter data store 250. For each obtained set of base network parameters 222a-p, the expert neural network training engine 240 can update the set of base network parameters 222a-p using each of one or more segmented training data sets 232 to generate respective sets of expert network parameters 242a-q.

In some implementations, the expert neural network training engine 240 fine-tunes a single base neural network to generate multiple different expert neural networks, using respective segmented training data sets 232. In some such implementations, the multiple different expert neural networks can share parameters. That is, the multiple different expert neural networks can be represented using a single network architecture that has multiple subnetworks, and which subnetworks are used to process a particular network input depends on the expert subnetwork to which the particular network input is provided.

For example, to fine-tune multiple expert neural networks from a single base neural network, the expert neural network training engine 240 can modify the architecture of the base neural network to add, for each expert neural network, a respective different subnetwork. As a particular example, the expert neural network training engine 240 can insert, into the architecture of the base neural network, an array of multiple subnetworks, called expert subnetworks in this specification, that are configured to receive the same subnetwork input and to provide their respective subnetwork outputs to the same one or more downstream layers of the base neural network. Each expert subnetwork can correspond to a respective different expert neural network, and can be trained using the respective corresponding segmented training data set 232. Expert subnetworks are discussed in more detail below with reference to FIG. 3.

The expert neural network training engine 240 can provide the q sets of expert network parameters 242a-q to the network parameter data store 250.

The network parameter data store 250 can be configured to store the trained network parameters of the candidate neural networks and provide the trained network parameters to a transfer learning system, e.g., the transfer learning system 100 described above with reference to FIG. 1, for use training a neural network to perform the first machine learning task.

Figure 3:
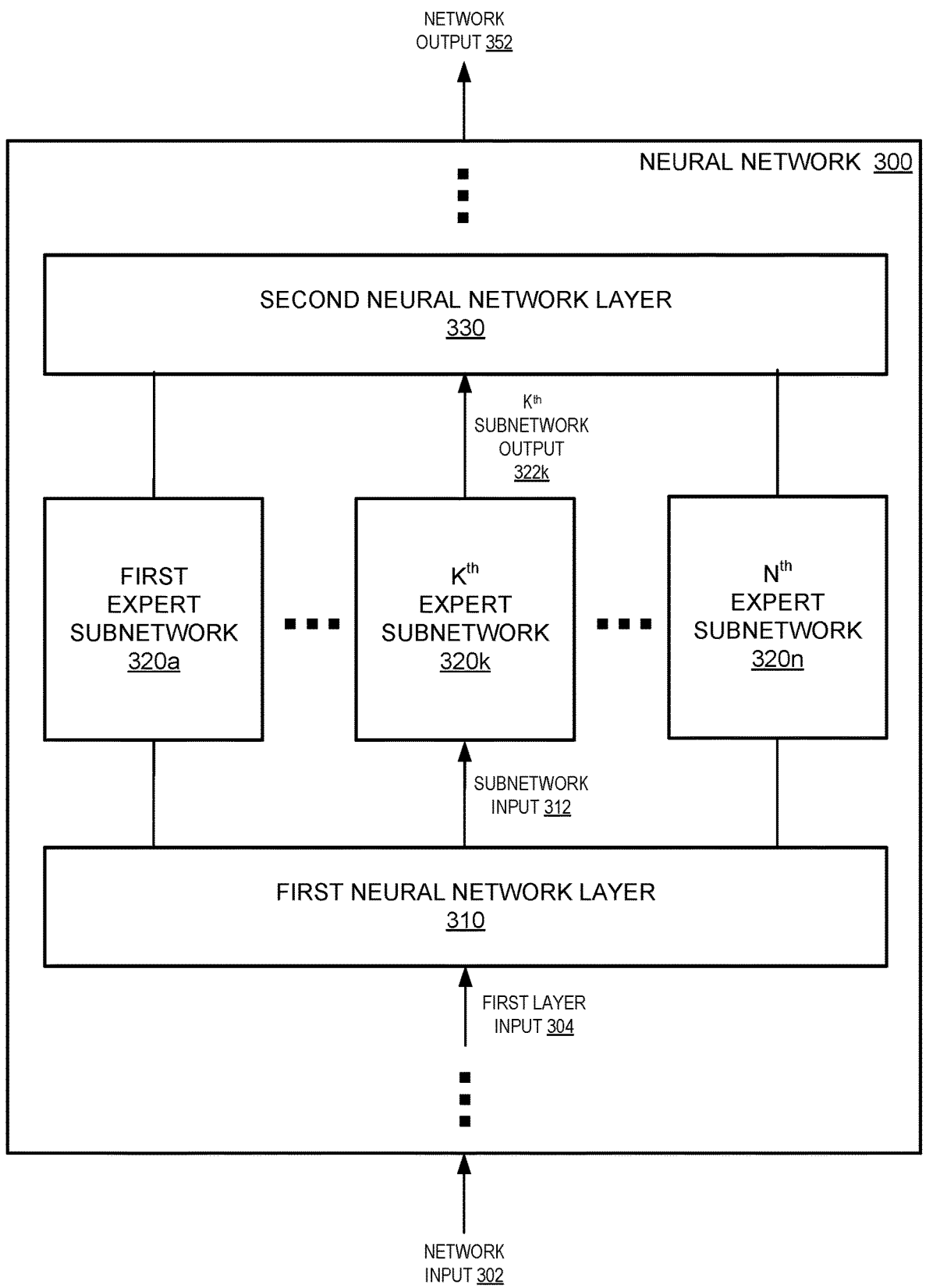
FIG. 3 is a diagram of an example neural network that includes an array of expert subnetworks.

FIG. 3 is a diagram of an example neural network 300 that includes an array of expert subnetworks 320a-k. The neural network 300 also includes a first neural network layer 310 and a second neural network layer 330.

The neural network 300 represents n different expert neural networks corresponding to the n expert subnetworks 320a-n. Each expert neural network includes (i) the corresponding expert subnetwork 320a-n and (ii) a set of neural network layers of the neural network 300 that are shared across all expert neural networks, including the first neural network layer 310 and the second neural network layer 330.

When the neural network 300 receives a network input 302, the network input 302 is associated with one of the n expert neural networks. The neural network 300 can process the network input 302 using the neural network layers that are included in the associated expert neural network to generate a network output 352.

In particular, the neural network 300 can process the network input 302 to generate a first layer input 304 for the first neural network layer 310. For example, the first layer input 304 can be the network input 302 itself, or a hidden representation of the network input 302 generated by one or more preceding neural network layers.

The first neural network can be configured to process the first layer input 302 to generate a subnetwork input 312, and to provide the subnetwork input 312 to the expert subnetwork 320a-n corresponding to the network input 302. That is, the first neural network layer 310 can be connected to each expert subnetwork 320a-n, but only provide the subnetwork input 312 to the one expert subnetwork associated with the network input 302.

Each expert subnetwork 320a-n can include one or more respective neural network layers for processing the subnetwork input 312. In some implementations, each of the expert subnetworks 320a-n have the same subnetwork architecture, e.g., the same number of neural network layers. In some other implementations, some of the expert subnetworks 320a-n have different respective architectures.

Each of the expert subnetworks 320a-n can be configured to generate a subnetwork output 322 and provide the subnetwork output 322 to the second neural network 330. As depicted in FIG. 3, the first neural network layer 310 can provide the subnetwork input 312 to the $k^{th}$ expert subnetwork 320k, which generates a subnetwork output 322k and provides the subnetwork output 322k to the second neural network 330. In some implementations, the neural network 300 includes a skip connection between the subnetwork input 312 and the respective subnetwork outputs 322 of the expert subnetworks 320a-n.

The neural network 300 can then process subnetwork output 322 using the second neural network 330 and, optionally, one or more other subsequent neural network layers to generate the network output 352.

The neural network 300 can be generated from a base neural network that was pre-trained on a particular second machine learning task. A system can obtain the parameters of the base neural network and generate the neural network 300 by adding the n expert subnetworks 320a-n to the architecture of the base neural network. In some implementations, the system can add multiple arrays of expert subnetworks 320a-n at different places in the architecture of the base neural network. Instead or in addition, the system can make other modifications to the architecture of the base neural network (e.g., by replacing a head of the base neural network as described above with reference to FIG. 2) to generate the neural network 300.

A training system can fine-tune each expert neural network to perform the same particular second machine learning task as the base neural network. The training system can fine-tune each expert neural network using a respective different training data set. That is, after the neural network 300 has been generated from the base neural network, the training system can fine-tune the parameters of the neural network 300 using n different training data sets, e.g., n different strict subsets of the same training set as described above with reference to FIG. 2.

When fine-tuning the neural network 300 using a training example from a particular training data set, the training system can update some or all of the parameters of the neural network 300 that are included in the expert neural network corresponding to the particular training data set. The training system does not update parameters of the neural network 300 that are not included in the expert neural network corresponding to the particular training data set; for example, when fine-tuning the $k^{th}$ expert neural network, the training system would not update the parameters of any expert subnetwork 320a-n except the $k^{th}$ expert subnetwork 320a-n.

In some implementations, the training system can "freeze" some of the parameters of the neural network 300; that is, the frozen parameters are not updated during the fine-tuning. For example, the training system can determine not to update the parameters of the shared neural network layers that are included in every expert subnetwork, e.g., the first neural network layer 310 or the second neural network layer 320. The training system can determine only to update parameters of an expert neural network that are singular to the expert neural network, e.g., the parameters of the corresponding expert subnetwork 320*a-n*.

By representing multiple expert neural networks using a single neural network 300 with shared parameters, a system can improve the space and time efficiency of fine-tuning the expert neural networks. For example, instead of fine-tuning each parameter in the neural network 300 to generate a single expert neural network, a training system can fine-tune only the array of expert subnetworks 320*a-n* to generate n different expert neural networks. This training technique can be an efficient way to generate a diverse set of expert neural networks that each correspond to a different training data set. The set of expert neural networks can then be included in a set of candidate neural networks for training a transfer-learned neural network, as described above with reference to FIG. 1.

Figure 4:
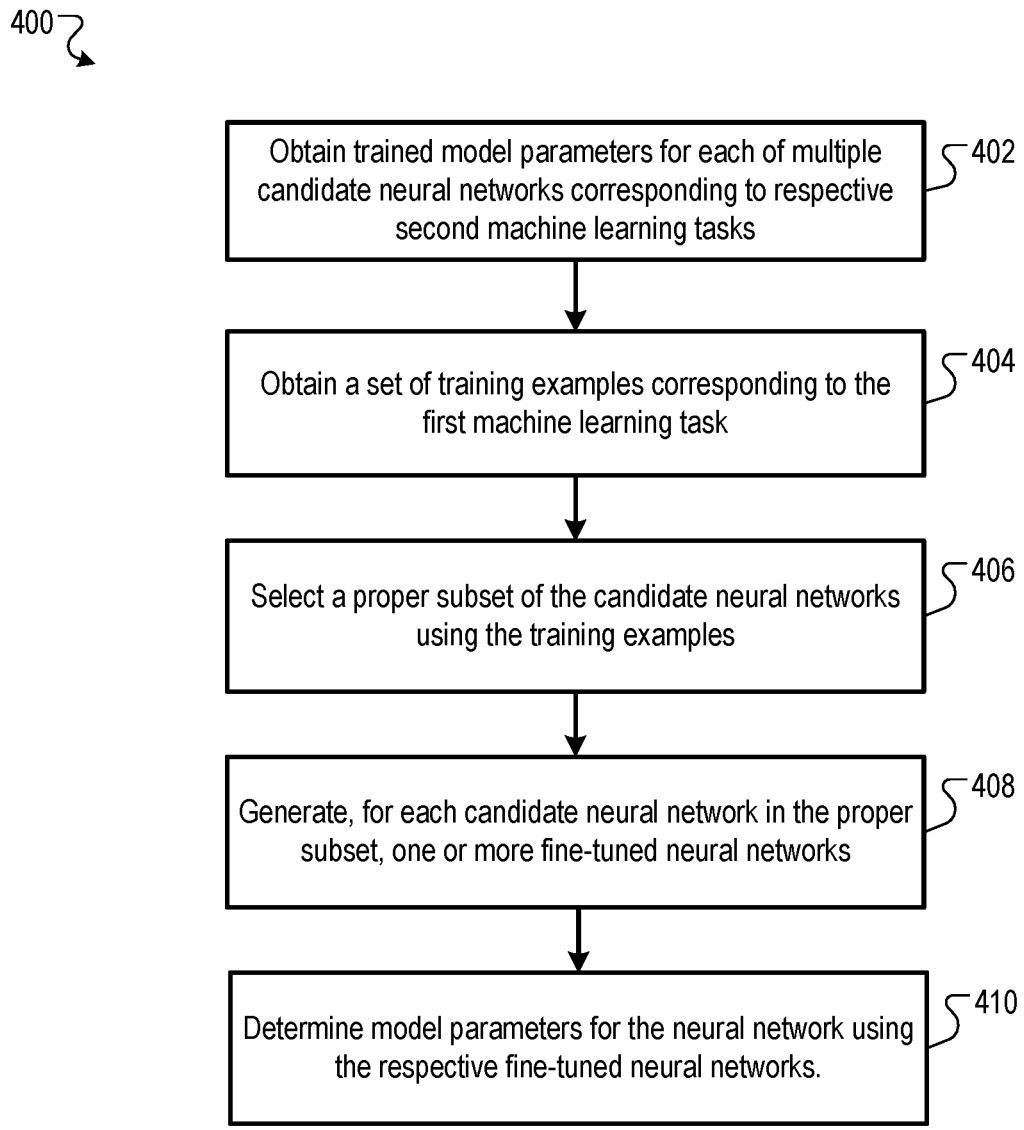
FIG. 4 is a flow diagram of an example process for training a neural network using a set of candidate neural networks.

FIG. 4 is a flow diagram of an example process 400 for training a neural network using a set of candidate neural networks. For convenience, the process 400 will be described as being performed by a system of one or more computers located in one or more locations. For example, a transfer learning system, e.g., the transfer learning system 100 depicted in FIG. 1, appropriately programmed in accordance with this specification, can perform the process 400.

The neural network can be configured to perform a first machine learning task.

The system obtains trained model parameters for each of multiple candidate neural networks (step 402). Each candidate neural network has been pre-trained to perform a respective second machine learning task that is different from the first machine learning task.

The system obtains a set of training examples corresponding to the first machine learning task (step 404).

The system selects a proper subset of the candidate neural networks using the training examples (step 406). In particular, the system processes the training examples to predict, for each candidate neural network, a performance of the candidate neural network on the first machine learning task, if the candidate neural network were fine-tuned using the training examples. The system can then select the candidate neural network with the highest predicted performance.

In some implementations, as described above with reference to FIG. 1, the system can use the training examples to train, for each candidate neural network, a respective machine learning model that can act as a performance proxy for how the candidate neural network would perform on the first machine learning task if fine-tuned using the training examples.

For example, if the training examples includes pairs of training inputs and corresponding ground-truth outputs, the system can process, for each candidate neural network, some or all of the training inputs using the candidate neural network to generate respective representations of the training inputs. The system can then use the representations generated by each candidate neural network, along with the corresponding ground-truth outputs of the training examples, to train the machine learning model corresponding to the candidate neural network. The system can then determine a performance of the machine learning model corresponding to each candidate neural network, and select the candidate neural networks whose corresponding machine learning models have the best performance.

For example, the system can perform a nearest-neighbor algorithm using the (representation, ground-truth output) pairs, e.g., a k-nearest-neighbors algorithm with cross-validation. That is, at each of one or more stages, the system can withhold a validation set that includes one or more (representation, ground-truth output) pairs, and perform k-nearest-neighbors on the remaining (representation, ground-truth network output) pairs. For each (particular representation, particular ground-truth network output) pair in the validation set, the system can determine the k nearest neighbors to the particular representation in the coordinate space of the representations, e.g., using Euclidean distance or Manhattan distance. The system can then determine the most common ground-truth output among the k nearest neighbors of the particular representation to be the predicted output for the particular representation, and determine an error between the predicted output and the particular ground-truth network output.

As a particular example, if k=1, the system can determine the ground-truth output of the closest neighbor to the particular representation to be the predicted output of the particular representation.

In some implementations, the system uses leave-one-out cross validation, where the validation set includes a single (representation, ground-truth network output) pair at each stage. The system can then select the one or more candidate neural networks with the highest cross validation accuracy.

As further examples, the system can train one or more of: a logistic regression model, a support vector machine (SVM), or a decision tree or random forest using the (representation, ground-truth output) pairs. Again, the performance of these trained models can be determined for each candidate neural network, and the system can select the candidate neural networks corresponding to the highest-performing machine learning models.

The system generates, for each candidate neural network in the proper subset, one or more fine-tuned neural networks (step 408). Each of the one or more fine-tuned neural networks can be generated by updating the model parameters of the corresponding candidate neural network using the set of training examples.

The system determines model parameters for the neural network using the respective fine-tuned neural networks (step 410). For example, the system can generate an ensemble neural network using some or all of the fine-tuned neural networks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for training a neural network to perform a first prediction task, the method comprising:
  obtaining trained model parameters for each of a plurality of candidate neural networks, wherein each candidate neural network has been pre-trained to perform a respective second prediction task that is different from the first prediction task;
  obtaining a plurality of training examples corresponding to the first prediction task;
  selecting a proper subset of the plurality of candidate neural networks using the plurality of training examples;
  generating, for each candidate neural network in the proper subset, one or more fine-tuned neural networks, wherein each of the one or more fine-tuned neural networks is generated by updating the model parameters of the candidate neural network using the plurality of training examples; and
  determining model parameters for the neural network using the respective fine-tuned neural networks.

Embodiment 2 is the method of embodiment 1, wherein the neural network is an ensemble neural network comprising each fine-tuned neural network.

Embodiment 3 is the method of any one of embodiments 1 or 2, wherein:
  the neural network is an ensemble neural network comprising a plurality of member neural networks; and
  determining model parameters for the neural network comprises:
    selecting, from the fine-tuned neural networks, the plurality of member neural networks of the ensemble neural network according to a performance of the fine-tuned neural networks on the first prediction task.

Embodiment 4 is the method of embodiment 3, wherein selecting, from the fine-tuned neural networks, the plurality of member neural networks of the ensemble neural network according to a performance of the fine-tuned neural networks on the first prediction task comprises:
  at a first time step, selecting the fine-tuned neural network that has a highest performance on the first prediction task;
  at each of one or more subsequence time steps, determining, from the remaining fine-tuned neural networks, a particular fine-tuned neural network that, when added to the ensemble neural network, causes the performance of the ensemble neural network on the first prediction task to most improve.

Embodiment 5 is the method of any one of embodiments 1-4, wherein the plurality of training examples comprises a plurality of training inputs and corresponding ground-truth outputs, and wherein selecting the proper subset of the plurality of candidate neural networks using the plurality of training examples comprises:
  for each of the plurality of candidate neural networks:
    processing at least some of the plurality of training inputs using the candidate neural network to generate a respective representation of the training input;
    configuring a machine learning model to process representations of training inputs generated by the candidate neural network and to generate predictions of the corresponding ground-truth outputs; and
    determining a measure of performance of the machine learning model; and
  selecting the proper subset of the plurality of candidate neural networks using the measures of performance of the machine learning models corresponding to the respective candidate neural networks.

Embodiment 6 is the method of embodiment 5, wherein determining the measure of performance for a candidate neural network comprises determining the measure of performance using leave-one-out cross validation.

Embodiment 7 is the method of any one of embodiments 5 or 6, wherein the machine learning model is a nearest-neighbor classifier.

Embodiment 8 is the method of any one of embodiments 1-7, wherein:
  each of the plurality of candidate neural networks was trained using a respective plurality of second training examples, wherein at least some of the respective pluralities of second training examples are different; and
  selecting the proper subset of the plurality of candidate neural networks using the plurality of training examples comprises, for each of the plurality of candidate neural networks, determining a predicted similarity between i) the plurality of training examples and ii) the plurality of second training examples that was used to train the candidate neural network.

Embodiment 9 is the method of embodiment 8 wherein:
  the plurality of training examples comprises a plurality of training inputs and corresponding ground-truth outputs;
  the respective plurality of second training examples corresponding to each candidate neural network comprises a plurality of second training inputs and corresponding second ground-truth outputs; and
  for each candidate neural network, determining a predicted similarity between i) the plurality of training examples and ii) the plurality of second training examples that were used to train the candidate neural network comprises one or more of:
    determining a similarity between a distribution of the training inputs and a distribution of the second training inputs, or determining a similarity between a distribution of the ground-truth outputs and a distribution of the second ground-truth outputs.

Embodiment 10 is the method of any one of embodiments 8 or 9, wherein:
the plurality of training examples comprises a plurality of training inputs;
the respective plurality of second training examples corresponding to each candidate neural network comprises a respective plurality of second training inputs; and
determining a respective predicted similarity between i) the plurality of training examples and ii) the plurality of second training examples that were used to train each candidate neural network comprises:
training, using each of the pluralities of second training inputs, a machine learning model to process a particular second training input and to generate a model output that comprises, for each candidate neural network, a respective likelihood value represented a predicted likelihood that the candidate neural network was trained using the particular second training input;
processing at least some of the plurality of training inputs using the machine learning model to generate respective model outputs; and
combining the respective model outputs to generate, for each candidate neural network, a respective similarity value representing the predicted similarity between i) the plurality of training examples and ii) the plurality of second training examples that were used to train the candidate neural network.

Embodiment 11 is the method of any one of embodiments 8-10, wherein:
each candidate neural network has been pre-trained to perform a same second prediction task;
the plurality of training examples comprises a plurality of training inputs;
the respective plurality of second training examples corresponding to each candidate neural network comprises a respective plurality of second ground-truth outputs; and
determining a respective predicted similarity between i) the plurality of training examples and ii) the plurality of second training examples that were used to train each candidate neural network comprises:
training a machine learning model to perform the same second prediction task using a training data set comprising the respective plurality of second training examples corresponding to each candidate neural network;
processing at least some of the plurality of training inputs using the machine learning model to generate respective model outputs;
for each candidate neural network, determining a similarity between (i) the model outputs and (ii) the plurality of second ground-truth outputs corresponding to the candidate neural network.

Embodiment 12 is the method of any one of embodiments 1-11, wherein each of a plurality of particular candidate neural network has been pre-trained to perform a same second prediction task,
the pre-training comprising:
training one or more base neural networks to perform the same second prediction task using a training data set;
determining a plurality of strict subsets of the training data set; and
for each of the one or more base neural networks and for each of one or more respective strict subsets, fine-tuning the base neural network using the strict subset to generate a respective expert neural network.

Embodiment 13 is the method of embodiment 12, wherein at least some of the plurality of strict subsets of the training data set correspond to respective categories of ground-truth labels in the training data set.

Embodiment 14 is the method of any one of embodiments 1-13, wherein, for at least a subset of the plurality of candidate neural networks, one or more of:
initial values for the model parameters of each candidate neural network in the subset were different;
each candidate neural network in the subset was trained using a respective different subset of a same training data set;
each candidate neural network in the subset has a different network architecture; or
each candidate neural network in the subset was trained to perform a respective different second prediction task.

Embodiment 15 is the method of any one of embodiments 1-14, wherein generating, for each candidate neural network in the proper subset, one or more fine-tuned neural networks comprises:
generating, for each candidate neural network in the proper subset, multiple fine-tuned neural networks by updating the model parameters of the candidate neural network according to each of a plurality of different sets of hyperparameter values.

Embodiment 16 is the method of any one of embodiments 1-15, wherein a number of candidate neural networks in the proper subset is determined using respective measures of predicted performance of the candidate neural networks on the first prediction task.

Embodiment 17 is the method of embodiment 16, wherein a candidate neural network is selected to be in the subset if a difference between i) the measure of predicted performance of the candidate neural network and ii) a highest measure of predicted performance of all the candidate neural networks is less than a threshold.

Embodiment 18 is the method of any one of embodiments 16 or 17, wherein:
a maximum number of candidate neural networks that can be in the proper subset is predetermined; and
if the number of candidate neural networks selected to be in the proper subset is less than the maximum number, then one or more additional fine-tuned neural networks are generated corresponding to respective candidate neural networks in the proper subset and according to respective different sets of hyperparameter values.

Embodiment 19 is a system comprising: one or more computers and one or more storage devices storing instructions that are operable, when executed by the one or more computers, to cause the one or more computers to perform the method of any one of embodiments 1 to 18.

Embodiment 20 is one or more non-transitory computer storage media encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a neural network to perform a first prediction task, the method comprising:
   obtaining trained model parameters for each of a plurality of candidate neural networks, wherein each candidate neural network has been pre-trained to perform a respective second prediction task that is different from the first prediction task;
   obtaining a plurality of training examples corresponding to the first prediction task;
   prior to fine-tuning any of the plurality of candidate neural networks for the first prediction task:
      predicting, for each plurality of candidate neural networks and using the plurality of training examples, a respective performance of the candidate neural network on the first prediction task, and
      selecting a proper subset of the plurality of candidate neural networks using the respective predicted performance on the first prediction task for each of the candidate neural networks;
   after selecting the proper subset, fine-tuning only the candidate neural networks in the proper subset for the first prediction task by generating, for each candidate neural network in the proper subset, one or more fine-tuned neural networks, wherein each of the one or more fine-tuned neural networks is generated by updating the model parameters of the candidate neural network using the plurality of training examples; and
   determining model parameters for the neural network using the one or more fine-tuned neural networks.

2. The method of claim 1, wherein the neural network is an ensemble neural network comprising each fine-tuned neural network.

3. The method of claim 1, wherein:
   the neural network is an ensemble neural network comprising a plurality of member neural networks; and
   determining model parameters for the neural network comprises:
      selecting, from the fine-tuned neural networks, the plurality of member neural networks of the ensemble neural network according to a performance of the fine-tuned neural networks on the first prediction task.

4. The method of claim 3, wherein selecting, from the fine-tuned neural networks, the plurality of member neural networks of the ensemble neural network according to a performance of the fine-tuned neural networks on the first prediction task comprises:
   at a first time step, selecting the fine-tuned neural network that has a highest performance on the first prediction task; and
   at each of one or more subsequence time steps, determining, from the remaining fine-tuned neural networks, a particular fine-tuned neural network that, when added to the ensemble neural network, causes a highest increase in the performance of the ensemble neural network on the first prediction task.

5. The method of claim 1, wherein the plurality of training examples comprises a plurality of training inputs and corresponding ground-truth outputs, and wherein selecting the proper subset of the plurality of candidate neural networks using the respective predicted performance on the first prediction task for each of the candidate neural networks comprises:
   for each of the plurality of candidate neural networks:
      processing at least some of the plurality of training inputs using the candidate neural network to generate a respective representation of the training input;
      configuring a machine learning model to process representations of training inputs generated by the candidate neural network and to generate predictions of the corresponding ground-truth outputs; and
      determining a measure of performance of the machine learning model, wherein the measure of performance is used to determine a predicted performance of the candidate neural network on the first prediction task; and
   selecting the proper subset of the plurality of candidate neural networks using the measures of performance of the machine learning models corresponding to the plurality of candidate neural networks.

6. The method of claim 5, wherein determining the measure of performance for a candidate neural network comprises determining the measure of performance using leave-one-out cross validation.

7. The method of claim 5, wherein the machine learning model is a nearest-neighbor classifier.

8. The method of claim 1, wherein:
   each of the plurality of candidate neural networks was trained using a respective plurality of second training examples, wherein at least some of the respective pluralities of second training examples are different; and
   selecting the proper subset of the plurality of candidate neural networks using the respective predicted performance on the first prediction task for each of the candidate neural networks comprises, for each of the plurality of candidate neural networks, determining a predicted similarity between i) the plurality of training examples and ii) the plurality of second training examples that was used to train the candidate neural network, wherein the predicted similarity is used to determine a predicted performance of the candidate neural network on the first prediction task.

9. The method of claim 8, wherein:
the plurality of training examples comprises a plurality of training inputs and corresponding ground-truth outputs;
the respective plurality of second training examples corresponding to each candidate neural network comprises a plurality of second training inputs and corresponding second ground-truth outputs; and
for each candidate neural network, determining a predicted similarity between i) the plurality of training examples and ii) the plurality of second training examples that were used to train the candidate neural network comprises one or more of:
  determining a similarity between a distribution of the training inputs and a distribution of the second training inputs, or
  determining a similarity between a distribution of the ground-truth outputs and a distribution of the second ground-truth outputs.

10. The method of claim 8, wherein:
the plurality of training examples comprises a plurality of training inputs;
the respective plurality of second training examples corresponding to each candidate neural network comprises a respective plurality of second training inputs; and
determining a respective predicted similarity between i) the plurality of training examples and ii) the plurality of second training examples that were used to train each candidate neural network comprises:
  training, using each of the pluralities of second training inputs, a machine learning model to process a particular second training input and to generate a model output that comprises, for each candidate neural network, a respective likelihood value represented a predicted likelihood that the candidate neural network was trained using the particular second training input;
  processing at least some of the plurality of training inputs using the machine learning model to generate respective model outputs; and
  combining the respective model outputs to generate, for each candidate neural network, a respective similarity value representing the predicted similarity between i) the plurality of training examples and ii) the plurality of second training examples that were used to train the candidate neural network.

11. The method of claim 8, wherein:
each candidate neural network has been pre-trained to perform a same second prediction task;
the plurality of training examples comprises a plurality of training inputs;
the respective plurality of second training examples corresponding to each candidate neural network comprises a respective plurality of second ground-truth outputs; and
determining a respective predicted similarity between i) the plurality of training examples and ii) the plurality of second training examples that were used to train each candidate neural network comprises:
  training a machine learning model to perform the same second prediction task using a training data set comprising the respective plurality of second training examples corresponding to each candidate neural network;
  processing at least some of the plurality of training inputs using the machine learning model to generate respective model outputs; and
  for each candidate neural network, determining a similarity between (i) the model outputs and (ii) the plurality of second ground-truth outputs corresponding to the candidate neural network.

12. The method of claim 1, wherein each of a plurality of particular candidate neural network has been pre-trained to perform a same second prediction task,
the pre-training comprising:
  training one or more base neural networks to perform the same second prediction task using a training data set;
  determining a plurality of strict subsets of the training data set; and
  for each of the one or more base neural networks and for each of one or more respective strict subsets, fine-tuning the base neural network using the strict subset to generate a respective expert neural network.

13. The method of claim 12, wherein at least some of the plurality of strict subsets of the training data set correspond to respective categories of ground-truth labels in the training data set.

14. The method of claim 1, wherein, for at least a subset of the plurality of candidate neural networks, one or more of:
  initial values for the model parameters of each candidate neural network in the subset were different;
  each candidate neural network in the subset was trained using a respective different subset of a same training data set;
  each candidate neural network in the subset has a different network architecture; or
  each candidate neural network in the subset was trained to perform a respective different second prediction task.

15. The method of claim 1, wherein generating, for each candidate neural network in the proper subset, one or more fine-tuned neural networks comprises:
  generating, for each candidate neural network in the proper subset, multiple fine-tuned neural networks by updating the model parameters of the candidate neural network according to each of a plurality of different sets of hyperparameter values.

16. The method of claim 1, wherein a number of candidate neural networks in the proper subset is determined using respective measures of predicted performance of the candidate neural networks on the first prediction task.

17. The method of claim 16, wherein a candidate neural network is selected to be in the subset if a difference between i) the measure of predicted performance of the candidate neural network and ii) a highest measure of predicted performance of all the candidate neural networks is less than a threshold.

18. The method of claim 16, wherein:
a maximum number of candidate neural networks in the proper subset is predetermined; and
if the number of candidate neural networks selected to be in the proper subset is less than the maximum number, then one or more additional fine-tuned neural networks are generated corresponding to respective candidate neural networks in the proper subset and according to respective different sets of hyperparameter values.

19. A system comprising one or more computers and one or more storage devices storing instructions that when executed by the one or more computers cause the one more computers to perform operations for training a neural network to perform a first prediction task, the operations comprising:
- obtaining trained model parameters for each of a plurality of candidate neural networks, wherein each candidate neural network has been pre-trained to perform a respective second prediction task that is different from the first prediction task;
- obtaining a plurality of training examples corresponding to the first prediction task;
- prior to fine-tuning any of the plurality of candidate neural networks for the first prediction task:
    - predicting, for each plurality of candidate neural networks and using the plurality of training examples, a respective performance of the candidate neural network on the first prediction task, and
    - selecting a proper subset of the plurality of candidate neural networks using the respective predicted performance on the first prediction task for each of the candidate neural networks;
- after selecting the proper subset, fine-tuning only the candidate neural networks in the proper subset for the first prediction task by generating, for each candidate neural network in the proper subset, one or more fine-tuned neural networks, wherein each of the one or more fine-tuned neural networks is generated by updating the model parameters of the candidate neural network using the plurality of training examples; and
- determining model parameters for the neural network using the one or more respective fine-tuned neural networks.

20. One or more non-transitory computer storage media storing instructions that when executed by one or more computers cause the one more computers to perform operations for training a neural network to perform a first prediction task, the operations comprising:
- obtaining trained model parameters for each of a plurality of candidate neural networks, wherein each candidate neural network has been pre-trained to perform a respective second prediction task that is different from the first prediction task;
- obtaining a plurality of training examples corresponding to the first prediction task;
- prior to fine-tuning any of the plurality of candidate neural networks for the first prediction task:
    - predicting, for each plurality of candidate networks and using the plurality of training examples, a respective performance of the candidate neural network on the first prediction task, and
- selecting a proper subset of the plurality of candidate neural networks using the respective predicted performance on the first prediction task for each of the candidate neural networks;
- after selecting the proper subset, fine-tuning only the candidate neural networks in the proper subset for the first prediction task by generating, for each candidate neural network in the proper subset, one or more fine-tuned neural networks, wherein each of the one or more fine-tuned neural networks is generated by updating the model parameters of the candidate neural network using the plurality of training examples; and
- determining model parameters for the neural network using the one or more fine-tuned neural networks.

* * * * *